United States Patent
McDonald (10) Patent No.: US 8,983,760 B2
(45) Date of Patent: Mar. 17, 2015

(54) METHOD AND SYSTEM OF CONTROLLING AIR TRAFFIC

(75) Inventor: Greg McDonald, Canberra (AU)

(73) Assignee: Airservices, Australia, Australian Capital Territory (AU)

( * ) Notice: Subject to any disclaimer, the term of this patent is extended or adjusted under 35 U.S.C. 154(b) by 834 days.

(21) Appl. No.: 12/811,052

(22) PCT Filed: Jan. 2, 2009

(86) PCT No.: PCT/AU2009/000021
§ 371 (c)(1),
(2), (4) Date: Nov. 29, 2010

(87) PCT Pub. No.: WO2009/082785
PCT Pub. Date: Jul. 9, 2009

(65) Prior Publication Data
US 2012/0004837 A1    Jan. 5, 2012

(30) Foreign Application Priority Data

Dec. 28, 2007  (AU) ................................ 2007907103
Feb. 26, 2008  (AU) ................................ 2008900925
Jul. 7, 2008    (AU) ................................ 2008903487

(51) Int. Cl.
*G08G 5/00*    (2006.01)

(52) U.S. Cl.
CPC ............ *G08G 5/0043* (2013.01); *G08G 5/0039* (2013.01); *Y02T 50/84* (2013.01)
USPC ............... 701/120; 701/1; 701/122; 701/465; 701/467; 340/961; 340/945; 340/972

(58) Field of Classification Search
CPC . G08G 5/0013; G08G 5/0043; G08G 5/0082; G08G 5/0026; G08G 5/065

USPC ............ 701/120, 301, 3, 117, 121, 467, 123, 701/465, 14, 1; 340/961
See application file for complete search history.

(56) References Cited

U.S. PATENT DOCUMENTS 5,121,325 A  * 6/1992  DeJonge ..................... 701/123
7,412,324 B1 * 8/2008  Bagge et al. ................. 701/120
(Continued)

FOREIGN PATENT DOCUMENTS

AU       200035446    * 4/2000    ............. G06F 19/00

OTHER PUBLICATIONS

Fight Trials: "Runway-To-Runway" Required Time of Arrival Evaluations for Time-Based ATM Environment Keith Wichman et al. Oct. 2001 IEEE.*
Aslaug Haraldsdottir et al., Performance Analysis of Arrival Management with 3D Paths and Speed Control, IEEE- 26th Digital Avionics Systems Conference Oct. 21-25, 2007.*
(Continued)

Primary Examiner — Helal A Algahaim
Assistant Examiner — Jelani Smith
(74) Attorney, Agent, or Firm — Locke Lord LLP; Howard M. Gitten (57) ABSTRACT

The present invention relates to a method and system for controlling air traffic. The method and system utilizes aircraft performance data, provided either by an FMS of a capable aircraft or generated by a model based on knowledge of the aircraft, to provide an accurate prediction of aircraft intent so that an accurate estimated time of arrival can be generated. The estimated time of arrival is then used to provide a required time of arrival (RTA) for the aircraft. The RTAs for the aircraft are provided for the aircraft to arrive at a destination, such as an Outer Fix Point, in a desired sequence. The desired sequence is arranged to provide intervals between the aircraft such that they may be able to land at the destination airport without requiring holding and vectoring from top of descent.

34 Claims, 4 Drawing Sheets

(56) References Cited

U.S. PATENT DOCUMENTS

| | | | |
|---|---|---|---|
| 7,437,225 B1* | 10/2008 | Rathinam | 701/14 |
| 7,650,232 B1 | 1/2010 | Paielli | |
| 2003/0050746 A1* | 3/2003 | Baiada et al. | 701/3 |
| 2004/0193362 A1* | 9/2004 | Baiada et al. | 701/120 |
| 2006/0173609 A1* | 8/2006 | Green | 701/120 |
| 2008/0228333 A1* | 9/2008 | De Menorval et al. | 701/14 |
| 2009/0012660 A1 | 1/2009 | Roberts et al. | |
| 2010/0114407 A1* | 5/2010 | Klooster et al. | 701/3 |
| 2010/0305781 A1 | 12/2010 | Felix | |

OTHER PUBLICATIONS

De Smedt, D et al: Study of the Required Time of Arrival Function of Current FMS in an ATM Context, IEEE/AIAA 26th Digital Avionics Conference, 2007, DASC'07, p. 1.D.5.1-1.D.5-10, Oct. 21-25, 2007.

Roberts, W.: "Vectors to the Final Approach Course", IFR Refresher, Feb. 1998, p. 10-15.

Written Opinion of the International Searching Authority for PCT/AU2012/001485.

\* cited by examiner

METHOD AND SYSTEM OF CONTROLLING AIR TRAFFIC

CROSS REFERENCES TO RELATED APPLICATIONS

This application is a U.S. national phase pursuant to 35 §371, of PCT/AU2009/000021 filed Jan. 2, 2009, which claims priority to Australian Patent Application Nos. 2007907103 filed Dec. 28, 2007; 2008900925 filed Feb. 26, 2008; and 2008903487 filed Jul. 7, 2008. The entire contents of the aforementioned patent application are incorporated herein by this reference.

FIELD OF THE INVENTION

The present invention relates to a method and system for controlling air traffic.

BACKGROUND OF THE INVENTION

At peak time, the runway(s) at an airport are often the capacity limiting function and their use needs to be optimised. Optimisation of runway use during busy and peak load times typically is at is at the cost of efficient aircraft operation. Traditional air traffic control (ACT) practice allows aircraft to arrive in the vicinity of the destination airport at a time of their choosing, and/or having made use of holding, vectoring, and path adjustment in the vicinity of the destination. ATC queues aircraft in a sequence for landing. ATC use Holding and Vectoring (path length for adjustment) to feed the aircraft to the runway with the desired spacing. The aircraft are spaced relative to each other ("using relative time"). The use of Holding at low altitude is fuel inefficient; Vectoring precludes the use of the aircraft Flight Management System (FMS) to optimise aircraft descent profile.

Precision navigation, such as Required Navigation Performance (Arrival) procedures (RNPs) provide the opportunity to improve efficiency of aircraft and fuel use. At high density airports during periods of peak traffic density, the use of Holding and Vectoring, or the controlling of aircraft arrivals via relative time (as opposed to absolute time) sequencing often denies an aircrafts FMS the opportunity to optimise trajectories, including RNP procedures to optimise aircraft operation.

SUMMARY OF THE INVENTION

In accordance with a first aspect, the present invention provides a method of controlling air traffic, comprising the steps of determining an estimated time of arrival (ETA) for each of a plurality of aircraft at a destination, utilising the ETA to establish a required time of arrival (RTA) at the destination for the aircraft, the RTA being established for the aircraft to arrive at the destination in a desired sequence, assessing aircraft intent during flight of the aircraft to estimate compliance with the RTA, the aircraft intent assessment for at least a plurality of the aircraft comprising obtaining aircraft performance data relating to aircraft trajectory from the flight management system (FMS) of capable aircraft and synthesising the obtained data with aircraft data relating to aircraft trajectory based on observation of the aircraft and data from the physical environment, to obtain a estimated trajectory of the aircraft, and adjusting the RTA or adjusting the desired sequence, if it is found that aircraft are not complying with the RTA.

In an embodiment, the RTA is established so that the aircraft arrive at the destination at different times, such that the aircraft are able to land without holding and vectoring from Top of Descent (TOD) for the aircraft. In an embodiment, aircraft may be able to land using precision navigation, such as Required Navigational Performance (RNPs) procedures.

In an embodiment, the step of determining ETA is based on aircraft performance. Aircraft performance may be based on aircraft data, which may be provided by the aircraft or provided by a ground based system (e.g. a ground based computing system) based on knowledge of the aircraft. Aircrafts with a capable Flight Management System (FMS) may be able to provide a great deal of aircraft data and may be able to provide an accurate prediction of aircraft intent which may then be used to provide an accurate prediction of ETA. Where the aircraft does not have a capable FMS (i.e. it is a non-capable aircraft), in an embodiment, a ground based system provides required aircraft data based on knowledge of the aircraft e.g. aircraft type, trajectory, etc.

Using aircraft performance to generate an accurate prediction of aircraft intent has the advantage that more accurate prediction of ETA can be obtained for traffic control than would be able to be obtained by using conventional air traffic control, which does not utilise sophisticated aircraft data such as may be provided by an FMS, but only uses the tools available to the ground control system, such as radar and meteorological data, for example.

Where an aircraft has a capable FMS, the aircraft may select a flight trajectory to make the most efficient operative use of the aircraft during the flight, as long as it complies with the RTA. The FMS of a capable aircraft may, in this embodiment, be considered to be used as part of an overall air traffic control system which comprises the FMS and a ground based system (e.g. the ground based computing system being operated by air traffic control). The ATC "load" is advantageously shared between systems.

In an embodiment, where the aircraft has a capable FMS, and a sophisticated communications system (such as future air navigation system (FANS)), communications between a FMS and a ground system may be automated so that the air traffic controller and pilot may not be involved except merely to confirm the RTA.

In an embodiment, the step of determining the ETA is carried out by making a prediction of future position of the aircraft and using this to calculate the ETA. Where the aircraft has a capable FMS, this prediction is done by the FMS.

In an embodiment, the method comprises the further step of iterating the ETA determination for the aircraft during flight, and determining whether the RTA of the aircraft is maintained. In an embodiment, the method comprises the further step of determining whether the desired sequence of the aircraft is being maintained. In an embodiment if the desired sequence is not being maintained, the RTA of one or more of the aircraft may be adjusted. In an embodiment, if the desired sequence is not being maintained, the desired sequence may be adjusted.

In an embodiment, the step of determining the ETA allows for a magnitude of error in the ETA, and the method comprises the further step of requiring that the error in the ETA is reduced as the flight proceeds.

In an embodiment, the method comprises the further steps of advising the aircraft of the RTA and requiring that the aircraft comply with the RTA.

In an embodiment, the step of establishing the RTA comprises the step of negotiating the RTA with the aircraft. In an embodiment, where the aircraft has a capable FMS, the FMS may negotiate the RTA with a ground based computing system. The negotiation may be automated.

In an embodiment, the step of establishing the RTA comprises the steps of calculating a required adjustment to the ETA so that the RTA is at a desired interval with respect to other aircraft arriving at the destination.

In an embodiment, the method comprises the further step of adjusting the flight of the aircraft so that the ETA and RTA coincide. The step of adjusting the flight of the aircraft may comprise the step of varying the aircraft speed. The step of adjusting the flight of the aircraft may comprise the step of varying the aircraft trajectory. The step of adjusting the flight of the aircraft may comprise the step of adjusting departure time of the aircraft from an originating airport. In an embodiment, the step of adjusting the flight of the aircraft is implemented during cruising of the aircraft, prior to the top of descent point for the aircraft flight.

In an embodiment, the destination may be a point in the vicinity of a destination airport, from which point the aircraft can manoeuvre to land on the runway. The point may be a feeder fix (FF) point, or an outer fix (OF) point further away from the FF. The point may be a top of descent point for the aircraft. The point may be a destination airport runway. The point may be any other point.

Because the aircraft arrive in sequence, in this embodiment there is the advantage that Holding and Vectoring may not be required in the vicinity of the arrival airport or after top of descent as the aircraft are arriving at known times spaced from each other. This has the advantage that aircraft having sophisticated FMSs may utilise their FMS to control the descent and landing of the aircraft and may use procedures designed to optimise efficiency of the aircraft e.g. continuous descent profiles from top of descent, and/or precision Required Navigation Performance (RNP) procedures, ATC may advise the aircraft which particular trajectory to use when they arrive at the destination. Even where aircraft do not have sophisticated FMSs, the descent profile and landing of the aircraft can still be optimised manually.

In an embodiment, as discussed above the flight of the aircraft may be required to be adjusted to meet the RTA. If flight adjustment is necessary, the most energy efficient time to do it is during the main portion of the flight e.g. cruise. Aircraft flight may be adjusted either by adjusting the speed of the aircraft during flight and/or the trajectory. In an embodiment, the aircraft TOA is established at a relatively early time during the flight e.g. during cruise of the aircraft and before the top of descent point.

In an embodiment, the ETA of the aircraft is monitored during the flight and may be updated. The ETA may be calculated by the aircraft as discussed above based on aircraft performance, or may be calculated by a ground based system based on knowledge of the aircraft performance. An updated ETA may result in a different TOA being established or may result in adjusting the flight to meet the already established RTA. In an embodiment, the ETAs of a plurality of aircraft arriving at the destination are monitored with respect to the TOAs and TOAs may be re-established or flights may be adjusted in order to meet the desired sequence of aircraft arrival. As discussed above, the desired sequence may be rearranged.

ETAs may be monitored at points along the flight path for the plurality of aircraft, the margin of error in the ETAs reducing as the destination is approached, in order to ensure that the RTAs are correct to within a desired error margin and the sequence of aircraft arrival is therefore satisfied.

The aircrafts FMS may be employed to control aircraft in achieving the desired ETA.

In an embodiment, as discussed above, the ETA may be calculated and the RTA may be established by processing systems which may be ground based and/or aircraft based. In an embodiment, the RTA may be negotiated with the aircraft and this may occur between the aircraft FMS and a ground based system. Verbal confirmation between the traffic controller and the aircraft of the established RTA may be required, all this could be done by a data link system. A future air navigation system (FANS), where available, may be employed as a means of automating communication with the aircraft.

In an embodiment, the method comprises the further step of providing a defined final intercept point for the aircraft which is at or above the minimum vectoring altitude (MVA).

In an embodiment, the method comprises the further step of arranging the desired sequence of aircraft so as to leave one or more places for the arrival of other aircraft. This has the advantage that aircraft that may not be sequenced in accordance with the provision of an ETA and RTA, may still be slotted into the arrival sequence. Non-capable aircraft, for example, whose ETA has not been calculated based on aircraft performance, for example, could be provided with available places in the desired sequence. This has the advantage that all types of air traffic may be handled by this method.

In accordance with a second aspect, the present invention provides a system for controlling air traffic, comprising a sequencer arranged to process respective estimated times of arrival (ETAs) for a plurality of aircraft at a destination, the sequencer being arranged to utilise the ETAs to establish respective required times of arrival (RTAs) at the destination for the aircraft, the RTAs being established for the aircraft to arrive at the destination in desired sequence with respect to each other, the sequencer being arranged to assess aircraft intent during flight of the aircraft to determine compliance with the RTA, the aircraft intent assessment for at least a plurality of the aircraft comprising obtaining aircraft data relating to aircraft trajectory from the flight management system (FMS) of capable aircraft and synthesising the obtained data with aircraft data relating to aircraft trajectory based on observation of the aircraft and data from the physical environment, to obtain a estimated trajectory of the aircraft, the sequencer being arranged to adjust the RTA or adjust the desired sequence, if it is found that aircraft are not complying with the RTA.

In an embodiment, the system further comprises a processor which is arranged to determine the ETA based on aircraft performance. In an embodiment, the aircraft performance comprises aircraft data.

In an embodiment, the processor may comprise an FMS of the aircraft, which may provide information such as trajectory from which an ETA may be calculated. The FMS may provide the ETA and also may control the aircraft to achieve the RTA. The aircraft FMS may select the appropriate trajectory and control the flight in order to make the most optimum use of the aircraft. In an embodiment, determination of the ETA, RTA and desired sequence may be shared between the sequencer and the processor. In an embodiment, the processor and/or sequencer may be partly ground based and partly FMS based.

In an embodiment, the processor may comprise a ground based system which is arranged to calculate the ETA based on a model of the aircraft. The aircraft may not have an FMS capable of determining the ETA, for example, and the processor therefore calculated the ETA based on knowledge of the aircraft performance e.g. including data such as the aircraft type, speed, capability, altitude capability, etc.

In an embodiment, the system further comprises a communications arrangement arranged to allow communication between a ground based computing system (which may implement the sequencer, part of the sequence, the processor, part of the processor) and the aircraft.

In accordance with a third aspect, the present invention provides a computer programme comprising instructions for controlling a computer to implement a method in accordance with the first aspect of the invention.

In accordance with a fourth aspect, the present invention provides a computer readable medium providing a computer programme in accordance with the third aspect of the invention.

In accordance with a fifth aspect, the present invention provides a data signal comprising a computer programme in accordance with the third aspect of the invention.

In accordance with a sixth aspect, the present invention provides a flight management system (FMS) for an aircraft, the FMS being arranged to calculate an ETA for use with a system in accordance with the second aspect of the invention.

In accordance with a seventh aspect, the present invention provides a computer program, comprising instructions for controlling a computer to implement a flight management system in accordance with the sixth aspect of the invention.

In accordance with an eight aspect, the present invention provides a computer readable medium, providing a computer program in accordance with the seventh aspect of the invention.

In accordance with a ninth aspect, the present invention provides a data signal, comprising a computer program in accordance with the seventh aspect of the invention.

In accordance with a tenth aspect, the present invention provides a method of controlling air traffic, comprising the steps of, for an aircraft landing procedure, providing a defined final intercept point which is at or above minimum vectoring altitude (MVA).

In accordance with an eleventh aspect, the present invention provides a system for controlling air traffic, the system comprising a sequencer arranged to provide a defined final intercept point for an aircraft landing procedure, which is at or above minimum vectoring altitude (MVA).

In accordance with a twelfth aspect, the present invention provides a computer program, comprising instructions for controlling a computer to implement a method in accordance with the tenth aspect of the invention.

In accordance with a thirteenth aspect, the present invention provides a computer readable medium, providing a computer program in accordance with the twelfth aspect of the invention.

In accordance with a fourteenth aspect, the present invention provides a data signal, providing a computer program in accordance with the twelfth aspect of the invention.

In accordance with the fifteenth aspect, the present invention provides a method of designing a landing procedure for air traffic, comprising the steps of providing a defined final intercept point which is at or above the minimum vectoring altitude (MVA).

In accordance with a sixteenth aspect, the present invention provides a computer program, comprising instructions for controlling a computer to implement a method in accordance with the fifteenth aspect of the invention.

In accordance with a seventeenth aspect, the present invention provides a computer readable medium, providing a computer program in accordance with the sixteenth aspect of the invention.

In accordance with an eighteenth aspect, the present invention provides a data signal, comprising a computer program in accordance with the sixteenth aspect of the invention.

In accordance with a nineteenth aspect, the present invention provides a method of controlling flight of an aircraft, comprising the steps of selecting a trajectory for the aircraft to a destination, determining an estimated time of arrival (ETA) of the aircraft at the destination, determining ETAs for plurality of other aircraft at the destination, establishing a required time of arrival (RTA) at the destination for the aircraft, the RTA being established for the aircraft to arrive at the destination at a different time from the other aircraft.

In accordance with a twentieth aspect, the present invention provides computer program, comprising instructions for controlling a computer to implement a method in accordance with the nineteenth aspect of the invention.

In accordance with a twenty-first aspect, the present invention provides a computer readable medium, providing a computer program in accordance with the twentieth aspect of the invention.

In accordance with a twenty-first aspect, the present invention provides a data signal, comprising a computer program in accordance with the nineteenth aspect of the invention.

BRIEF DESCRIPTION OF THE DRAWINGS

Features and advantages of the present invention will become apparent from the following description of an embodiment thereof, by way of example only, with reference to the accompanying drawings, in which.

DETAILED DESCRIPTION OF EMBODIMENT

The following embodiment discloses a method of and system for controlling air traffic to an airport based on establishing a required time of arrival (RTA) for each of a plurality of aircraft wishing to arrive at the airport. In prior art systems, aircraft arrive within the vicinity of a destination airport and then Holding and Vectoring are used to "manage" the aircraft onto the runway(s) in a sequence relative to other aircraft. The aircraft will often be queued (for example, by being held in a "stack") and only allowed to leave the queue and land in the appropriate landing sequence. Timing of the landing is relative to other aircraft. It is not "absolute time".

Figure 1:
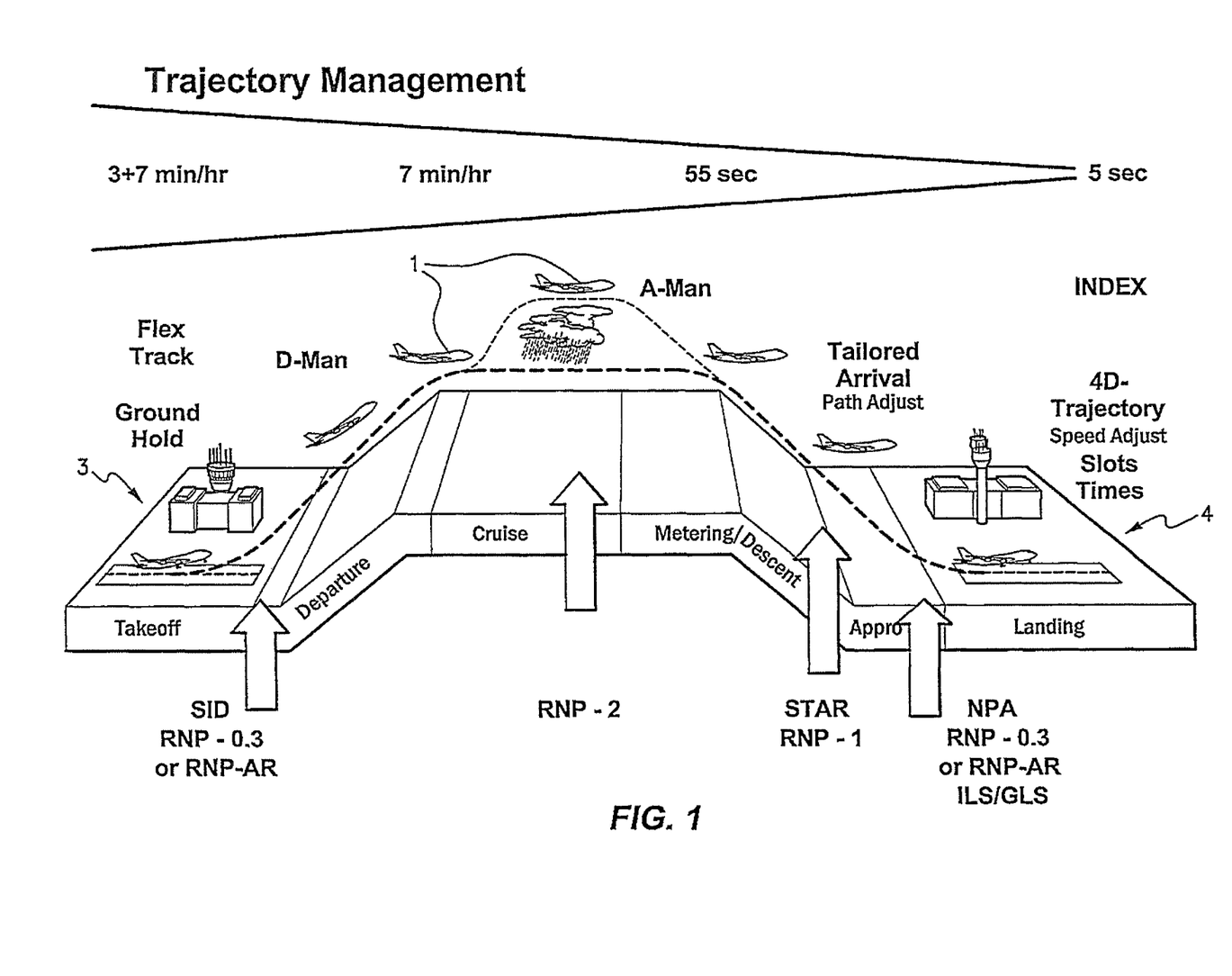
FIG. 1 is a schematic diagram illustrating a take off, cruise and landing profile for an aircraft controlled in accordance with an embodiment of the present invention.

With this embodiment of the present invention, an RTA at a destination is established for each aircraft in absolute time. The aircraft is intended to arrive at the established RTA and land on the runway(s), without implementation of Holding and Vectoring. The RTA is established so that the aircraft arrive in a desired sequence at the destination may avoid Holding and Vectoring. In this embodiment, an estimated time of arrival is determined for each aircraft and the ETA is used to establish the RTA for each aircraft. In this embodiment, the ETA is based on aircraft performance, which can be determined by the FMS of an aircraft having an FMS or by an alternative processing system, which may be ground based, where the aircraft being controlled does not have a suitably advanced FMS. The aircraft performance is determined based on aircraft data. This may include trajectory data, speed data, position data, aircraft capability data and other data. Input relating to actual aircraft performance results in a much more accurate ETA than with conventional air traffic control systems. Conventional air traffic control systems, where they do attempt to determine an ETA for an aircraft, do this by using data available to the ground based ATC system, such as radar, meteorological data, etc, without any knowledge or significant knowledge of aircraft performance. In this embodiment, the aircraft performance may be provided in the form of aircraft intent (trajectory etc.) by an FMS of a capable aircraft. Alternatively, as discussed above, aircraft performance may be provided by a model based on knowledge of an aircraft which does not have an FMS capable of providing the aircraft performance information (non-capable aircraft). FIG. 1 shows a schematic diagram of a flight of an aircraft 1. The aircraft 1 has an FMS (see FIG. 2) 2. Referring again to FIG. 1, the take off of the aircraft from an originating airport 3 is departure managed (D-Man). The aircraft ascends to its cruise altitude to fly to a destination airport 4, and enters cruise. In this embodiment, an FMS of the aircraft 1 may choose a flight trajectory to make the most efficient operative use of the aircraft. During cruise an ETA is calculated for the aircraft 1, at a destination relative to the destination airport 4. In this embodiment, the destination is a Feeder Fix (FF) point, but it may be any chosen destination such as an Outer Fix (OF) point, or landing on the runway, or any other point. The ETA is then utilised by a ground based ATC system 5 (FIG. 2), together with the FMS 2, to establish a RTA for the aircraft 1. In this embodiment, the destination point is before the top of descent of the aircraft trajectory. RTA will also be established in dependence on ETAs calculated for other aircraft arriving at the destination point. The system determines the RTA so that a sequence of arrival of aircraft at the destination is created. The sequence has optimum gaps between aircraft arriving at the destination, to avoid or minimise Holding or Vectoring of the aircraft at the destination.

The ETA is recalculated periodically during the flight and changes to the flight to meet the established RTA, or re-establishment of a RTA, may be required so that the aircraft arrive in the necessary sequence. The ETA is therefore monitored so that the sequence of arrival is resolved as the flight progresses. The desired sequence may be readjusted depending on monitoring of the ETA.

A tailored arrival may be used for descent and approach, such as a Required Navigation Performance (RNP) procedure. Establishment of the TOA and monitoring of the ETA is termed Arrival Management (A-Man).

Figure 2:
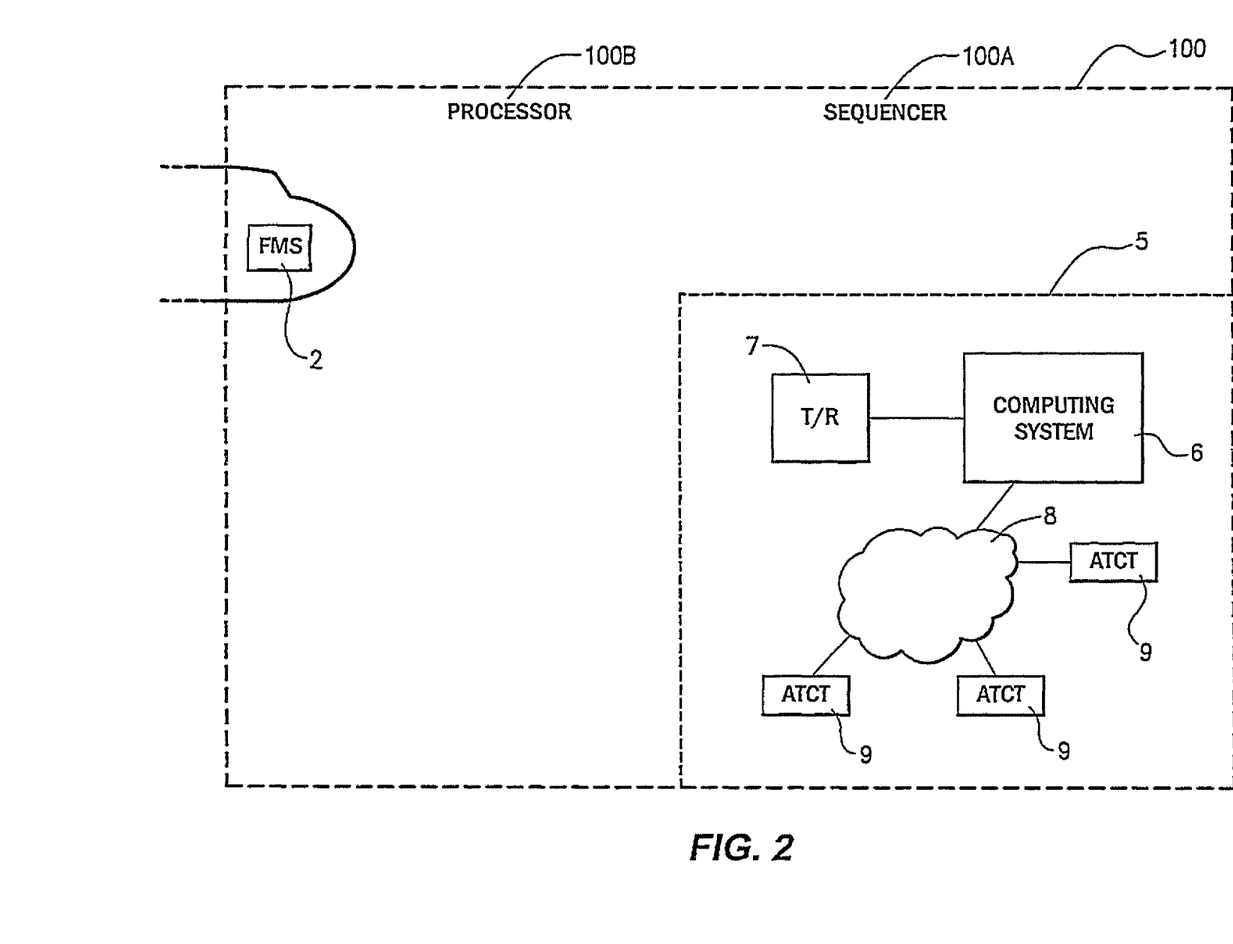
FIG. 2 is a schematic diagram of a system in accordance with an embodiment of the present invention.

FIG. 2 is a schematic diagram of a system in accordance with an embodiment of the present invention, designated generally by reference numeral 100. The system broadly comprises a sequencer 100A and processor 100B. The sequencer and processor, in this embodiment, is implemented by a ground based system 5 and an aircraft based flight management system, FMS 2. The sequencer 100A is arranged to utilise ETAs of aircraft to establish respective required times of arrival (RTAs) at the destination for the aircraft. The RTAs are established for the aircraft to arrive at the destination in a desired sequence with respect to each other.

The processor 100B is arranged to determine the ETA based on aircraft performance.

Depending upon the implementation, the processor may be air based, partly air based and partly ground based, or totally ground based. For example, in one implementation, the processor 100B may be implemented by the FMS 2, which is arranged to communicate a determined ETA to the ground system. In another embodiment, the processor 100B may be implemented totally by the ground based system 5. This embodiment is useful where a ETA is required to be determined for non-capable aircraft (aircraft which do not have an FMS capable of calculating the ETA).

In an embodiment, the ground system 5 may have the capability of implementing the processor 100B but may allow the processor 100B to be implemented by an FMS 2 for a capable aircraft. The processor 100B would be implemented by the ground based system 5 for non-capable aircraft.

In an embodiment, the implementation of processor 100B may be shared between an air based system, such as implemented by an FMS 2, and the ground based system 5.

The sequencer 100A will generally be implemented by ground based system 5. In some embodiments, however, aspects of operation of the sequencer 100A may be shared by an air based system, such as FMS 2.

For capable aircraft, the FMS 2 may include a future air navigation system (FANS) package, which is an advanced system which includes the ability to automate communications with ground based system 5.

The ground based system 5 may be implemented by any appropriate computing system and may be based on current air traffic control systems. The computing system 6 may comprise any type of computer architecture including server/client, mainframe/terminal, etc. A transmitter/receiver arrangement 7 is arranged to communicate with aircraft, including FMS 2 of capable aircraft and also systems of non-capable aircraft, and pilots. The computing system 6 be networked to air traffic control terminals ATCT 9 via network 8, allowing an interface for air traffic controllers to the system.

The systems 5 and 2 are programmed with appropriate computer software to implement the functionality of the embodiment described in the specification.

Figure 3:
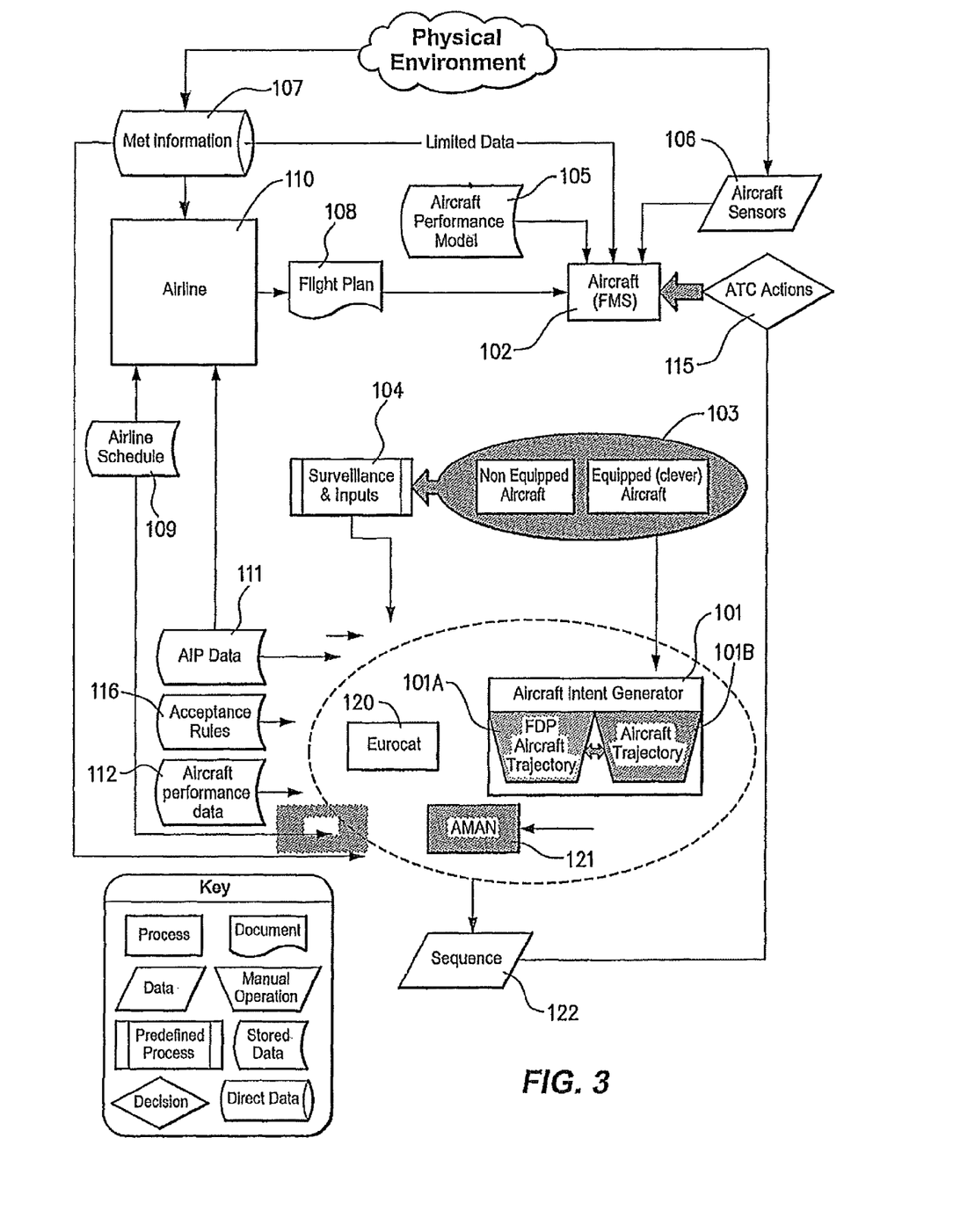
FIG. 3 is a more detailed schematic illustrating operation diagram of an air traffic control system in accordance with an embodiment of the present invention.

A system in accordance with an embodiment of the present invention will now be described in more detail with reference to FIG. 3. FIG. 3 shows the entirety of a system for planning and monitoring an aircraft flight and sequencing aircraft at a destination.

In accordance with this embodiment, the system comprises an aircraft intent generator 101 which is arranged to take information from a plurality of inputs to determine aircraft intent (based on aircraft performance). The aircraft intent generator 101 takes all available aircraft information (including available trajectories) either direct from the aircraft (capable aircraft FMS), from the generation of a "model" based on knowledge of aircraft performance (for non-capable aircraft) or in the usual manner from a flight data processor (101A) based on observation of the aircraft and data from the physical environment (e.g. meteorological data, radar etc). The aircraft performance information 101B (from capable aircraft or models of non-capable aircraft) is synthesised with the FDP data 101A to get a more accurate weighted trajectory which can be relied on for significantly greater accuracy for determination of ETA. The information about aircraft performance from the capable aircraft or based on models of non-capable aircraft significantly improves the accuracy of determination of ETA.

In more detail, the aircraft 102 (in the case of a capable aircraft 102, try FMS) receive information about the aircraft flight path to its required destination (e.g. top of descent, Feeder Fix, way point, out fix or any position in inner space) and the aircraft trajectory to the destination is calculated. In the case of an FMS capable aircraft 102 this trajectory is calculated and provided to the aircraft intent generator 101 (box 103). In the case of a non-capable aircraft, a model is utilised and/or conventional surveillance and inputs 104 are used to determine the trajectory. The aircraft trajectory calculation may be affected by aircraft sensors 106 and meteorological information 107. In addition it will be affected by the information about the aircraft flight path obtained via the flight plan 108 which will be affected by the airline schedule.

Note that for a non-capable aircraft, a trajectory may be provided by air traffic control (see box 115) or the pilot may calculate the trajectory and provide it to the intent generator 101. Other inputs include acceptance rules 116.

An ETA for the destination point for the aircraft is determined based on aircraft intent. The ETA is updated for the aircraft as flights progress, and provided to the air traffic control system (Eurocat 120, arrival management A man 121) as the flights progress and a sequence is iteratively determined (box 122). Air traffic control 115 feeds back to the aircraft to maintain a sequence, or adjust the sequence accordingly. Maestro (a known aircraft sequence tool) may be used to generate an arrival sequence list for a plurality of aircraft arriving at the destination. Note that alternatively to Maestro a separate sequencing tool may be used. Note that the system may reference many data sources as indicated in FIG. 3, such as acceptance rules 116, aircraft movement schedule, etc. that may impact the flight arrival timing, in order to generate a sequence list 112.

A RTA is produced for each aircraft which is uploaded to the aircraft via a data link or voice. A required time adjustment may be calculated by the AT system for ETAs for all the arriving aircraft to produce the RTA. The RTAs for the aircraft will be adjusted so that the arrival timing of the aircraft is at optimal interval. For example, there may be an underlying aim of getting the aircraft onto the runway on time plus or minus 5 seconds of target time.

The aircraft may negotiate with the ATC to establish a final RTA for the aircraft. Flight adjustment may be necessary e.g. a change in speed and/or trajectory. This may be done during cruise, however, which is more efficient. The process will involve calculations in control provided the aircrafts FMS in capable aircraft. In the case of an old aircraft not capable of calculating its predicted time of arrival the ATC may calculate and generate a new trajectory. It may be a manual process which aims to provide the best estimate of a planes arrival time at a destination point.

All aircraft are required to continue to target RTA by adjustments to speed and/or trajectory.

In some cases, the sequence of aircraft may be adjusted.

Figure 4:
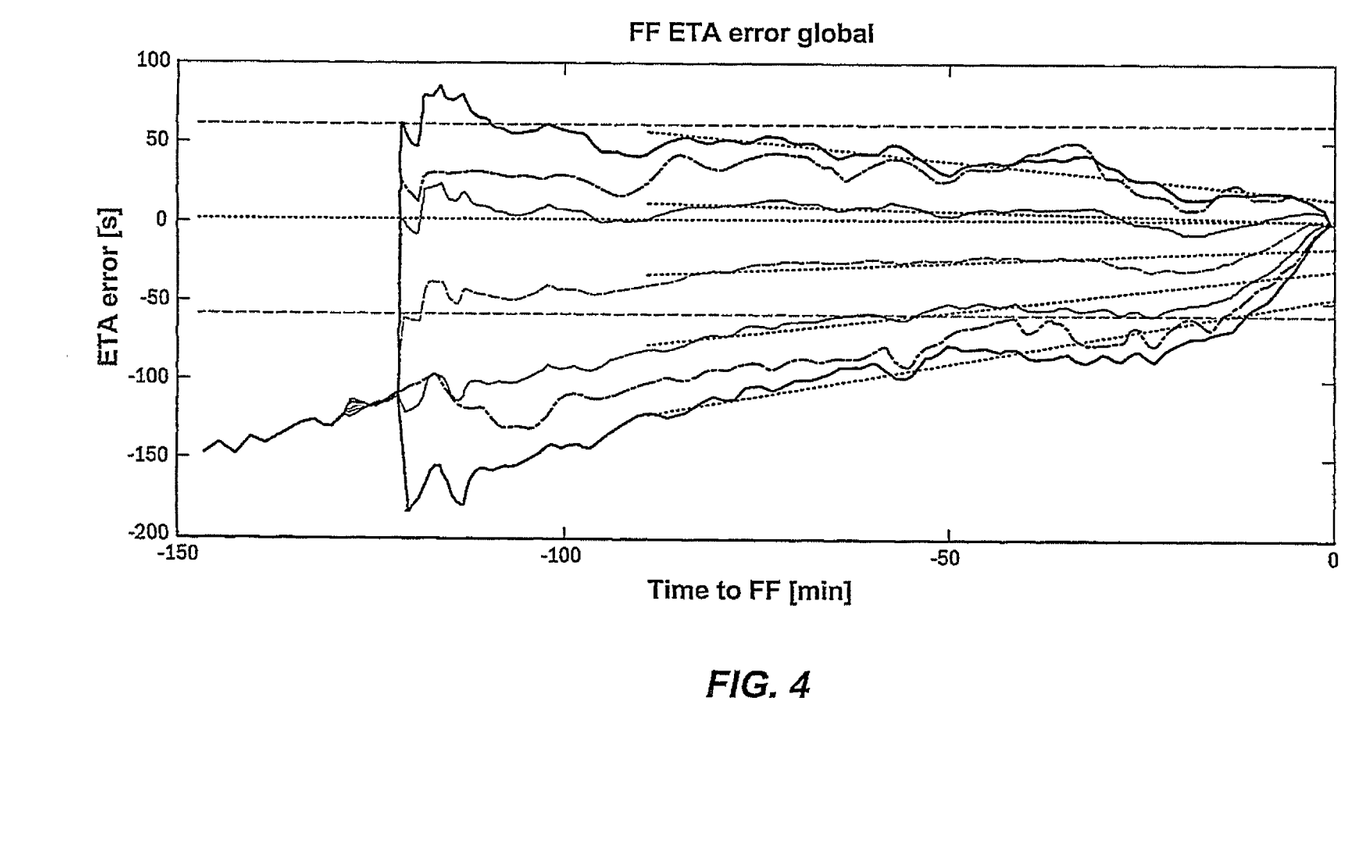
FIG. 4 is a diagram showing error in estimated time of arrival (ETA) of an aircraft against time to a Feeder Fix (FF) destination point for a plurality of aircraft controlled in accordance with an embodiment of the present invention.

Early on in the flights it is likely that the ETAs will have a larger error than later on in the flights. The effective principal is to have aircraft achieve times at sequencing points within success of the small and tighter buffers as the flights approach destination point. FIG. 4 shows a graph showing ETA error against time to Feeder Fix point for a plurality of aircraft. It can be seen that using the control process in accordance with the present invention the ETA error reduces as a Feeder Fix point is approached, and the RTAs are therefore resolved in time for arrival of the aircraft at the destination.

ATC may define a final intercept point for the aircraft which is at or above the minimum vectoring altitude (MVA).

Providing the final intercept point before the MVA gives ATC and the aircraft time to make any changes, if required.

Using an embodiment of this invention, air traffic can be controlled to avoid or minimise Holding or Vectoring from top of descent for the aircraft. An absolute RTA is provided (rather than a relative time provided for conventional sequencing of aircraft in a holding pattern). This absolute time can act as the aircraft clearance. All the aircraft has to do is to keep to the RTA. The flight of the aircraft can therefore be controlled in the most optimum way both at take off, cruise and also landing. It may be possible to use precision navigation, such as RNPs for landing.

Examples

The following examples illustrate operation of a system and method in accordance with an embodiment of the present invention. The example, for simplicity, refers to only a few aircraft. In actual implementation, it will be appreciated that the system and method may handle many more aircraft then in the following examples.

A. Three aircraft, a, b, and c are heading into Sydney from different departure points and arriving from different directions. They all have FMS and are capable of transmitting their intent to the ground systems of ATC. ATC receives trajectories and ETAs at the destination from each as follows: 1.00.00 pm, 1.00.05 pm, and 12.59.30 pm. ATC establishes that for the prevailing conditions at the destination airport (Sydney) it wishes to space aircraft at 40 second intervals at top of descent. It determines that the first available landing time is 12.59 pm. ATC determines to sequence the aircraft in the order c, a, b, at times 12.59, 1.00.40, and 1.01.20. The ground system can "see" the trajectory reported by each aircraft including the Top Of Descent point and can calculate the delay that must be inserted into the flight prior to TOD to achieve the time at the runway threshold. The sequencer calculates and notifies the controller of the TOD time for the aircraft which sent to the FMSs via datalink. ATC facilitate path stretching of the aircraft in the cruise to the adjusted TOD descent time which effectively time shifts the FMS calculated CDA to a time that can be accommodated by ATC. Fine tuning of the sequence is done by ATC providing descent speed control instructions to the pilot but without touching the lateral path expected by the FMS. The FMSs update the sequencer of their new trajectories and estimates. ATC through the sequencer confirm the waypoint times can be achieved and the FMSs control the aircraft and achieve the times. As the aircraft progress towards their TOD, the time they are estimating to be there is continually compared to the time ATC have scheduled them to be there and if outside of defined buffers, the controller is alerted. The planes arrive at top of descent, each does a CDA which may have RNP requirements then landing within a defined buffer of the ATC specified time.

B. Aircraft d notifies ATC it intends to arrive at 1.00.00 pm. It has a short distance to travel having come from Wollongong. The sequencer determines that the aircraft can not land earlier than 1.02 pm. The plane does not have an FMS. The air traffic management system determines a trajectory using stored aircraft performance data coupled with observed performance and known weather conditions and predicts the planes RTA, and based on this calculation the sequencer assigned the 1.02 pm time. ATC through the sequencer monitor the plane and instruct it to slow to a speed to achieve the 2 minute delay. During the flight the system determines that the plane is not keeping sufficient speed, and it will arrive 3 minutes late. The sequencer continually monitors and readjusts the sequence, accommodates other planes to the 1.02, and 1.02.40 time positions, etc to achieve the 40 second spacing and to accommodate the non-capable aircraft. The example could also be that the non-capable aircraft is coming in too quickly, and the capable aircraft may need to be sped up a little.

The achievement of the TOD for all aircraft will be within a time buffer that permits refinement of the threshold time using only descent speed manipulation of the descending aircraft without adjustment of its lateral path.

In one embodiment, the ATC may plan the use of runway(s) for both departures and arrivals of aircraft:
  Priority will be given to landing aircraft
  Use of the runway will be scheduled by time
  Scheduling will be a dynamic process
  Initially build from airline/aircraft operating schedules (where available)
  Refined using aircraft Flight Plan Information (available shortly before flight)
  Becoming increasingly refined closer to time using updates from airlines and operators;
    Departing Aircraft—notification of key events such as:
      start of loading
      closed doors
      engine start/push back
      taxi complete
      Ready for Flight
    Arriving Aircraft—negotiated Required Time of Arrival (see below)
  It is an ATC role to optimise operations across all aircraft:
    With knowledge of all aircraft requests (and desired times) for runway use
    ATC allocate the aircraft a position in the runway use sequence and a
    Required Time of Arrival (RTA) or Time of Departure
  It is each aircraft's role to optimise own operation given the RTA or Departure time
    Aircraft can sit on or just off the gate until the optimum time to start engines and taxi for takeoff
    Aircraft can plan their time of arrival at the destination airport and use judicious speed control en route to arrive at the optimum time, thus avoiding holding and vectoring
A final intercept point is provided for each landing procedure which is above the minimum vectoring altitude (MVA). This is also the case where aircraft may wish to use RNP's. They will be aware of the defined final intercept point, as will air traffic control (ATC). Any changes to the landing procedure will be made before or at the final intercept point.
  Departure time and RTA is given in absolute time of day
  Aircraft are expected to honour allocated time with an accuracy in the order of +−5 seconds
Efficiency Benefits
Benefits Accrue from:
  Removal of Holding and Vectoring for arriving/landing aircraft
  Optimised descent vertical profile for arriving/landing aircraft
  Avoidance of ground hold with engines running for departing aircraft
  Resulting in:
    Reduced operating hours
    Reduced fuel consumption
    Reduced emissions and noise In the above embodiment, the establishment of the RTA occurs during cruise. The invention is not limited to this. The RTA may be established before departure, for example, during descent (for example a long descent) or at any other time.

As discussed above, advanced aircraft may be fitted with FANS (Future Aircraft Navigation System) which provides accurate prediction information and can predict where a plane is going to be up to 4 hours in front and over with very high accuracy. This will be very useful for calculation of an ETA.

As discussed above, the destination may be any point. In one embodiment, the destination may be an outer fix (OF) point. The OF point may be in a different position in space for every flight, but will generally be the same number of track miles to the airport e.g. 150 track miles. An OF point like this may be very convenient to provide an RTA for a plurality of aircraft.

Where capable aircraft have sophisticated FMSs such as FANS, the majority of the communications and calculations may be automated (e.g. between FANS and the ground system).

There may be aircraft arriving at destinations which for some reason (e.g. they are non-capable and there is no model stored in the ground based system for them) are unable to have an accurate RTA provided in accordance with an embodiment of the invention. In an embodiment, to take account of this, positions may be provided in the sequence for such non-capable aircraft to arrive. That is these non-capable aircraft may be included in the sequence, by providing a number of available places for them.

The embodiment of the invention described above uses aircraft data, provided in some form either by the aircraft or generated by a model based on the aircraft, to provide an accurate prediction of aircraft intent so that an accurate ETA can be generated. This ETA is then used to provide an RTA for the aircraft. This is far more sophisticated than merely using conventional techniques, which have input such as radar and meteorological data, without accurate information on aircraft intent.

Where embodiments of the invention are implemented by software, the programme code may be supplied in a number of ways. For example, on a computer readable medium, such as a disc or memory, or as a data signal (for example, by downloading it from a server).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of controlling air traffic, comprising the steps of: a ground based computing system receiving an aircraft trajectory data that defines a planned flight trajectory for each of a plurality of aircraft, from an on-board flight management system (FMS) of a respective aircraft, the ground based computing system utilizing the aircraft trajectory data to establish a required time of arrival (RTA) at a destination for each of the aircraft, the RTA being established for each of the aircraft to arrive at the destination in a desired sequence, the ground based computing system, assessing an aircraft intent during flight of each of the aircraft to estimate compliance with the RTA, the aircraft intent assessment comprising obtaining an aircraft performance data from the flight management system (FMS) of each of the respective aircraft and synthesizing the obtained aircraft performance data with aircraft trajectory data based on an observation of the respective aircraft and data from a physical environment, to obtain an estimated trajectory of the respective aircraft; and the ground based computing system adjusting the desired sequence, if it is found that any of the respective aircraft are not complying with the RTA.

2. A method in accordance with claim 1, wherein the ground based computing system establishes the RTA so that each of the aircraft arrives at the destination at a different time from the other aircraft such that the aircraft are able to land without holding and vectoring from top of descent (TOD) for the aircraft.

3. A method in accordance with claim 1, wherein the aircraft performance data comprises one or more of aircraft type, velocity, trajectory, position, speed capability, altitude capability, altitude.

4. A method in accordance with claim 1, wherein the data from the physical environment comprises meteorological data.

5. A method in accordance with claim 1, wherein aircraft performance data comprises a prediction of future position provided by the flight management system (FMS) of each of the aircraft.

6. A method in accordance with claim 5, wherein the step of establishing the RTA comprises the ground based computing system calculating a required time adjustment to each of the respective aircraft's estimated time of arrival (ETA) so that a corresponding RTA is at a desired interval with respect to other aircraft arriving at the destination.

7. A method in accordance with claim 5, comprising the further step of adjusting the flight of the aircraft so that the ETA and RTA coincide.

8. A method in accordance with claim 7, wherein the step of adjusting the flight of the aircraft is implemented during cruising of the aircraft, prior to a top of descent point.

9. A method in accordance with claim 1, comprising the further step of the ground based computing system receiving aircraft trajectory updates for the respective aircraft during flight and determining whether the RTA of the respective aircraft is maintained.

10. A method in accordance with claim 9, comprising the further step of the ground based computing system determining whether the desired sequence of the aircraft is being maintained.

11. A method in accordance with claim 10, comprising the step of the ground based computing system if the desired sequence is not being maintained adjusting the RTA of one or more of the aircraft to maintain the desired sequence when the desired sequence is not being maintained.

12. A method in accordance with claim 9, comprising the step of the ground based computing system adjusting the desired sequence when the desired sequence is not being maintained.

13. A method in accordance with claim 9, comprising the ground based system allowing for a magnitude of error in the received aircraft trajectory data and further requiring that the aircraft trajectory data magnitude of error reduces as flight of the corresponding aircraft proceeds.

14. A method in accordance with claim 1, comprising the further step of the ground based computing system providing a defined final intercept point for each of the aircraft which is at or above a minimum vectoring altitude (MVA).

15. A method in accordance with claim 1 comprising the further step of the ground based computing system arranging the desired sequence of aircraft so as to leave one or more places for the arrival of aircraft that have not been included in the desired sequence.

16. A method in accordance with claim 1, wherein the aircraft trajectory data includes latitude, longitude, altitude and time co-ordinates for each planned flight trajectory.

17. A method in accordance with claim 16, wherein the aircraft trajectory data includes an estimated time of arrival (ETA) for a corresponding aircraft at the destination.

18. A system for controlling air traffic, comprising: a ground based computing system arranged to receive an aircraft trajectory data that defines a planned flight trajectory for each of a plurality of aircraft from an on-board flight management system (FMS) of a respective aircraft, the ground based computing system being arranged to utilize the aircraft trajectory data to establish a required time of arrival (RTAs) at a destination for each of the aircraft, the RTAs being established for each aircraft to arrive at the destination in a desired sequence with respect to each other, the ground based computing system being arranged to assess an aircraft intent during flight of each of the aircraft to determine compliance with the RTA, the aircraft intent assessment comprising obtaining an aircraft performance data from the on-board flight management system (FMS) of each of the respective aircraft and synthesizing the obtained aircraft performance data with an aircraft data based on an observation of the respective aircraft and data from a physical environment, to obtain an estimated trajectory of the respective aircraft, the ground based computing system being arranged to adjust the RTA or adjust the desired sequence, if it is found that any of the respective aircraft are not complying with the RTA.

19. A system in accordance with claim 18, wherein the ground based computing system is arranged to establish the RTAs so that each of the aircraft arrives at the destination at different times such that they are able to complete their descent as a continuous descent approach (CDA) without additional holding and vectoring.

20. A system in accordance with 18, wherein aircraft performance data comprises one or more of aircraft type, aircraft velocity, aircraft trajectory, aircraft positioning, aircraft speed capability, aircraft altitude capability.

21. A system in accordance with claim 18, wherein the data from the physical environment comprises meteorological data.

22. A system in accordance with claim 18, wherein the aircraft data comprises a prediction of future position of the aircraft.

23. A system in accordance with claim 18, wherein the ground based computing system is arranged to receive aircraft trajectory updates for each of the aircraft during flight and determine whether the RTA of the aircraft is maintained.

24. A system in accordance with claim 23, wherein the ground based computing system is arranged to determine whether the desired sequence of the aircraft is being maintained.

25. A system in accordance with claim 24, wherein the ground based computing system is arranged, if it determines that the desired sequence is not being maintained, to adjust the RTA of one or more of the aircraft to maintain the desired sequence.

26. A system in accordance with claim 24, wherein the ground based computing system is arranged, if it determines that the desired sequence is not being maintained, to adjust the desired sequence.

27. A system in accordance with claim 18, wherein the ground based computing system is arranged to allow for a magnitude of error in a received estimated time of arrival (ETA), and require that the aircraft trajectory data magnitude of error reduces as the flight of the corresponding aircraft proceeds.

28. A system in accordance with claim 27, wherein the ground based computing system is arranged to establish each of the RTAs by calculating a required time adjustment to the respective (ETA) so that the RTA for an aircraft is at a desired interval with respect to other aircraft arriving at the destination.

29. A system in accordance with claim 27, wherein the ground based computing system is arranged to provide instructions to the FMS of an aircraft for adjusting the planned flight trajectory of the aircraft so that the ETA and RTA coincide.

30. A system in accordance with claim 29, wherein the ground based computing system is arranged to instruct flight trajectory adjustments during cruising of the aircraft, prior to a top of the descent point.

31. A system in accordance with claim 18, wherein the ground based computing system is arranged to provide a defined final intercept point for each of the aircraft which is at or above a minimum vectoring altitude (MVA).

32. A system in accordance with claim 18, wherein the ground based computing system is arranged to establish the desired sequence so as to leave one or more places for arrival and landing of other aircraft.

33. A system in accordance with claim 18, wherein the aircraft trajectory data includes latitude, longitude, altitude and time co-ordinates for each planned flight trajectory.

34. A system in accordance with claim 33, wherein the aircraft trajectory data includes an estimated time of arrival (ETA) for a corresponding aircraft at the destination.

* * * * *

UNITED STATES PATENT AND TRADEMARK OFFICE
CERTIFICATE OF CORRECTION

| | |
|---|---|
| PATENT NO. | : 8,983,760 B2 |
| APPLICATION NO. | : 12/811052 |
| DATED | : March 17, 2015 |
| INVENTOR(S) | : Greg McDonald |

It is certified that error appears in the above-identified patent and that said Letters Patent is hereby corrected as shown below:

Title Page

In the Assignee name - item (73), please delete the "," after "Airservices, Australia", so as to read:

Airservices Australia

Signed and Sealed this
Seventh Day of June, 2016

Michelle K. Lee
*Director of the United States Patent and Trademark Office*